(12) United States Patent
Takahashi et al.

(10) Patent No.: US 6,632,572 B1
(45) Date of Patent: Oct. 14, 2003

(54) LITHIUM SECONDARY BATTERY

(75) Inventors: Masatoshi Takahashi, Itano-gun (JP); Zensaku Yasutake, Itano-gun (JP); Koji Abe, Ube (JP); Akira Ueki, Ube (JP); Toshikazu Hamamoto, Ube (JP)

(73) Assignees: Sanyo Electric Co., Ltd., Moriguchi (JP); Ube Industries, Ltd., Ube (JP)

( * ) Notice: Subject to any disclaimer, the term of this patent is extended or adjusted under 35 U.S.C. 154(b) by 0 days.

(21) Appl. No.: 09/608,144

(22) Filed: Jun. 30, 2000

(30) Foreign Application Priority Data

Jun. 30, 1999 (JP) .......................................... 11-185554

(51) Int. Cl.[7] ............................................. H01M 10/40
(52) U.S. Cl. ........................ 429/326; 429/329; 252/62.2
(58) Field of Search ........................ 252/62.2; 429/326, 429/329, 53–56

(56) References Cited

U.S. PATENT DOCUMENTS

| | | | | |
|---|---|---|---|---|
| 4,670,363 A | * | 6/1987 | Whitney et al. | ............ 429/199 |
| 5,776,627 A | | 7/1998 | Mao et al. | |
| 5,853,912 A | * | 12/1998 | Naing et al. | ................... 429/53 |
| 5,879,834 A | | 3/1999 | Mao | |

FOREIGN PATENT DOCUMENTS

| | | | |
|---|---|---|---|
| EP | 0759641 A | 2/1997 | |
| JP | 05036439 A | * 2/1993 | .......... H01M/10/40 |
| JP | 07302614 A | 11/1995 | |
| JP | 10074537 A | 3/1998 | |
| JP | 10275632 A | 10/1998 | |
| WO | WO 01 03226 | 1/2001 | |
| WO | WO 01 03227 | 1/2001 | |

OTHER PUBLICATIONS

Patent Abstracts of Japan, vol. 1998, No. 08, Jun. 1998 & JP 10 074537A (Fuji Photo Film Co Ltd), Mar. 17, 1998.
Database WPI, Section Ch, Week 200060, Derwent Publications Ltd., London, GB; AN 2000–621370, XP002185633.
Database CA Online! Chemical Abstracts Service, Columbus, Ohio, US, Ono et al, "Secondary Lithium Batteries with Long Cycle Life and Storage Stability" retrieved from STN, Database Accession No. 121:60827.
Patent Abstracts of Japan, vol. 017, No. 204 (E–620), Jun. 11, 1988 & JP 63 004569A (Bridgestone Corp).
Patent Abstracts of Japan, vol. 1996, No. 03, Mar. 29, 1996 & JP 07 302614 A (Sony Corp), Nov. 14, 1995.

* cited by examiner

*Primary Examiner*—Carol Chaney
(74) *Attorney, Agent, or Firm*—Nixon & Vanderhye P.C.

(57) ABSTRACT

A lithium secondary battery including an electrode assembly composed of positive and negative electrode plates wound up spirally with a separator and disposed in a cell casing filled with electrolyte containing lithium salt dissolved in organic solvent wherein the cell casing is provided with a current interrupt device for cutting off a charge current of the battery when an internal gas pressure of the battery exceeds a predetermined value, and wherein the organic solvent contains aklylbenzene derivative or cycloalkylbenzene derivative having tertiary carbon adjacent a phenyl group.

20 Claims, 1 Drawing Sheet

LITHIUM SECONDARY BATTERY

RELATED APPLICATION

This application claims priority from Japanese Patent Application No. 11(1999)-185554, filed Jun. 30, 1999, the entire disclosure of which is incorporated herein by reference.

BACKGROUND OF THE INVENTION

1. Field of the Invention

The present invention relates to a lithium secondary battery using electrolyte consisting of organic solvent containing lithium salt dissolved therein and more particularly to a lithium secondary battery using electrolyte the safety of which is ensured even if the battery is overcharged.

2. Description of the Prior Art

In recent years, a demand for a power source in the form of a small size and light weight battery has increased because of noticeable development of small size and light weight electronic appliances. Under such situations, a lithium secondary battery such as a lithium ion battery has been developed as a rechargeable small size and light weight battery of higher capacity for use in portable electronic appliances such as a small size video camera, a portable telephone, a not-book type personal computer and the like.

In such lithium secondary batteries, a carbon material capable of absorbing and desorbing lithium ion is used as a negative electrode active material, a lithium transition metal oxide compound such as $LiCoO_2$, $LiMn_2O_4$ or the like is used as a positive electrode active material, and an organic solvent containing lithium salt dissolved therein is used as electrolyte. In the lithium secondary battery assembled with the components, lithium ions are desorbed from the positive electrode and absorbed into carbon during an initial charge of the battery so that the lithium secondary battery can be used as a rechargeable battery.

When the lithium secondary battery is overcharged, an excessive amount of lithium ions are extracted from the positive electrode and inserted into the negative electrode in accordance with an overcharged condition of the battery. This causes both the positive and negative electrodes to become thermally unstable, resulting in decomposition of the organic solvent of the electrolyte. As a result, the battery becomes over heated by abrupt exothermic reaction of the electrolyte, and the safety of the battery becomes over heated by abrupt exothermic reaction of the electrolyte, and the safety of the battery deteriorates. Particularly, such safety problems become very important when the energy density of the lithium secondary battery is increased.

To solve the safety problems, Japanese Patent Laid-open Publication No. 7-302614 proposes a method for enhancing the safety of the battery by addition of a small amount of aromatic compound to the electrolyte. In the method proposed in the Japanese Patent Laid-open Publication No. 7-302614, a carbon material is used for the negative electrode, and an aromatic compound such as anisol derivative having $\pi$ electron orbit at an reversible redox potential more noble than a positive electrode potential when fully charged in a molecular amount of less than 500) is added as an additive to the electrolyte of the battery. Such an aromatic compound is useful to prevent the battery from overcharge for protection of the battery.

Proposed also in Japanese Patent Laid-open Publication No. 9-106835 (corresponding with U.S. Pat. No. 5,879,834) is a method for enhancing the safety of the battery by addition of an additive to the electrolyte of the battery. In the method proposed in the Japanese Patent Laid-open Publication No. 9-106835, a carbon material is used for the negative electrode, and a small amount of biphenyl, 3-R-thiophene, 3-chlorothiophene, furan at the like is used as the additive to the electrolyte of the battery so that the internal resistance of the battery is increased by polymerization of the components at a higher battery voltage than a maximum operating voltage of the battery for protection of the battery in an overcharged condition.

In the method proposed in the Japanese Patent Laid-Open Publication 7-302614, the anisol derivative is effective to restrain overcharge of the battery but deteriorates the cycle characteristic and storage characteristic of the battery. The aromatic compound is decomposed by oxidation at an electric potential of about 4.5 V to generate gas therefrom and forms a polymerized substance for protection of the battery in an overcharged condition. However, in case the component of the electrolyte permits dissolution of the polymerized substance therein, the battery may not be protected in an overcharged condition. Consequently the aromatic compound such as anisol derivative having or electron orbit does not effect to restrain overcharge of the battery.

In the method proposed in the Japanese Patent Laid-open Publication No. 9-106835, the biphenyl used as the additive to the electrolyte is lower in polarity and lower in solubility. Accordingly, the additive is partly deposited during operation of the battery at a low temperature, resulting in deterioration of the battery performance. In addition, 3-chlorothiophene causes difficulty in its handling since it is stimulus and malodorous and is easily decomposed by oxidation. Similarly, the furan is also easily decomposed by oxidation. This results in deterioration of the battery performance.

SUMMARY OF THE INVENTION

To solve the problems discussed above, a primary object of the present invention is directed to provide a lithium secondary battery in which an additive effective for preventing overcharge of the battery is added to electrolyte to ensure the safety of the battery without causing any deterioration of the cycle characteristic and storage characteristics at a low temperature.

According to the present invention, the object is accomplished by providing a lithium secondary battery which includes a cell casing provided with a current interrupt device for cutting off a charge current of the battery when an internal gas pressure of the battery exceeds a predetermined value, wherein the cell casing is filled with organic solvent containing an additive such as aklylbenzene derivative or cycloalkylbenzene derivative having tertiary carbon adjacent a phenyl group. As the tertiary carbon adjacent the phenyl group is active and higher in reaction, hydrogen atom is easily extracted from the tertiary carbon in an overcharged condition of the battery. This causes rapid decomposing reaction of the additive when the battery is overcharged. As a result, hydrogen gas generates and polymer of the additives is produced by polymerization reaction of the additive. In the lithium secondary battery, when the internal gas pressure of the battery exceeds the predetermined value, the current interrupt device is operated to cut off the charge current of the battery. From the foregoing fact, it is presumed that addition of the additive to the organic solvent is effective to restrain decomposition of the electrolyte thereby to ensure the safety of the battery. In this respect, it is noted that the polymer of the additives acts as a resistance substance in an overcharged condition of the battery and does not dissolve in the electrolyte. This is useful to effectively protect the battery against overcharge.

Since the additive added to the organic solvent is in a liquid state at a room temperature, higher in polarity and higher in dissolubility to the electrolyte, the additive may not be deposited during operation of the battery at a low temperature and does not cause any deterioration of the battery performance even if added to the electrolyte. Accordingly, in use of the electrolyte added with the additive together with lithium salt dissolved in the organic solvent, the additive is useful to ensure the safety of the battery without causing any deterioration of the low temperature characteristic and storage characteristics of the battery.

In a practical embodiment of the present invention, it is desirable that the alkylbenzene derivative is at least one of additives selected from the group consisting of isopropylbenzene (cumene), 1,3-diisopropylbenzene, 1,4-diisopropylbenzene, 1-methylpropylbenzene, 1,3-bis(1-methylpropyl) benzene and 1,4-bis(1-methylpropyl) benzene. It is also desirable that the cycloalkylbenzene derivative is selected from either cyclohexylbenzene or cyclopentylbenzene.

BRIEF DESCRIPTION OF THE DRAWINGS

Other objects, features and advantages of the present invention will be readily appreciated from the following detailed description of preferred embodiments thereof when taken together with the accompanying drawings, in which.

DESCRIPTION OF THE PREFERRED EMBODIMENT

Figure 1:
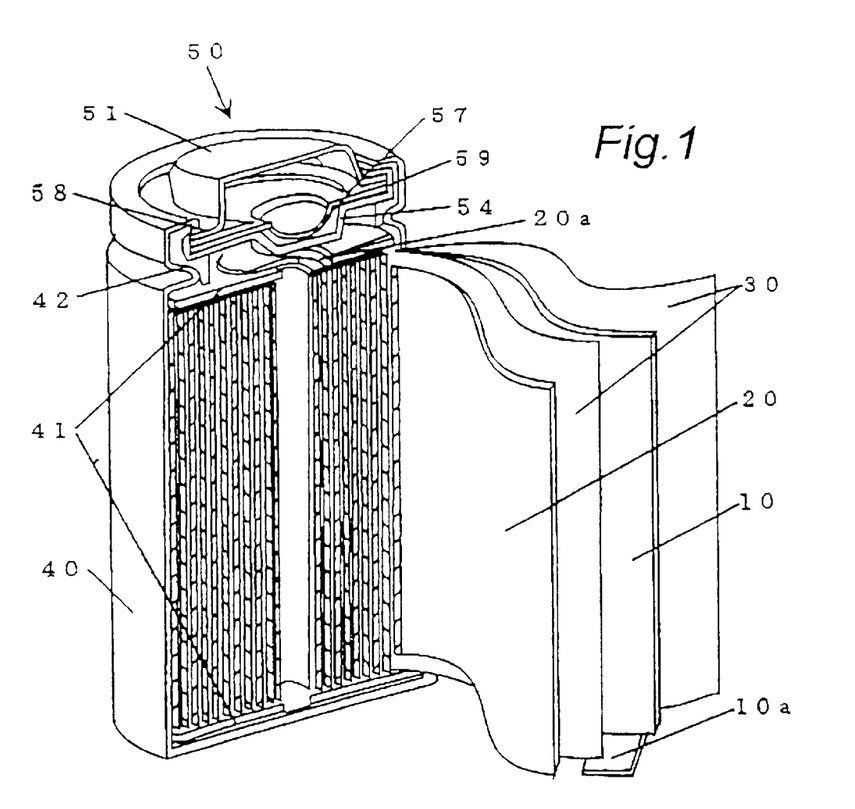
FIG. 1 is a sectional view of a lithium secondary battery in accordance with the present invention.
Figure 2:
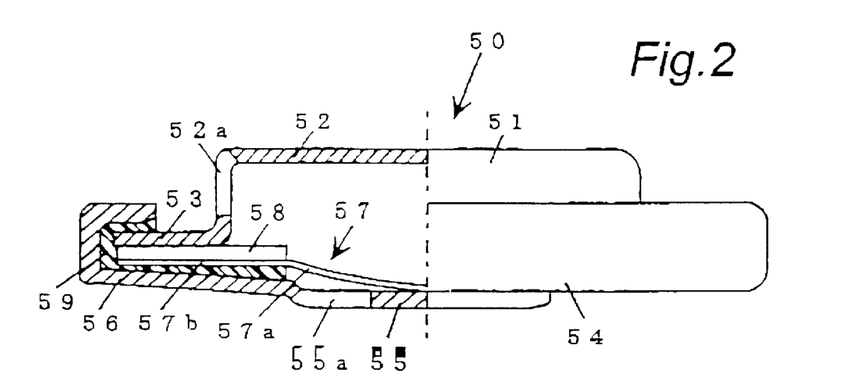
FIG. 2 is a party broken sectional view of an electric current interrupt device coupled with an opening of the cell casing shown in FIG. 1.

Hereinafter, an embodiment of a lithium secondary battery in accordance with the present invention will be described with reference to FIGS. 1 and 2 of the drawings. FIG. 1 is a sectional view of the lithium secondary batters in a condition where positive and negative electrode plates wound through a separator are contained in a cell casing, and FIG. 2 is a partly broken sectional view of an electric current interrupt device coupled with an opening of the cell casing.

1. Production of a Negative Electrode Plate

A mixture of a negative electrode active material of natal graphite (d=3, 36 Å) and a bonding agent of polyvinylidene fluoride (PVdF) was dissolved in organic solvent of 1-methyl-2-pyrrolidone AMP) to prepare a slurry or paste. The slurry was uniformly coated on opposite entire surfaces of a metal core in the form of a copper foil of 20 $\mu$m using a die-coater, a doctor blade or the like to produce a negative electrode plate coated with an active material layer. Similarly, the paste was uniformly coated on opposite entire surfaces of the metal core by a roller coating method to produce a negative electrode plate coated with an active material layer. The negative electrode plate coated with the active material layer was passed through a dryer to remove the organic solvent used for preparation of the slurry or paste. Thereafter, the dried negative electrode plate was rolled under pressure by a roller pressing machine to produce a negative electrode plate 10 of 0.14 mm in thickness.

2. Production of a Positive Electrode Plate

A mixture of a positive electrode active material of $LiCoO_2$, a carbon conductive agent of acetylene black, graphite and the like and a bonding agent of polyvinylidene fluoride (PVdF) were dissolved in organic solvent of 1-methyl-2-pyrrolidone (NMP) to prepare a slurry or paste. The slurry was uniformly coated on opposite entire surfaces of a metal core in the form of an aluminum foil of 20 $\mu$m using a die-coater, a doctor blade or the like to produce a positive electrode plate coated with an active material layer. Similarly; the paste was uniformly coated on opposite entire surfaces of the metal core by a roller coating method to produce a positive electrode plate coated with the active material layer. The positive electrode plate coated with the active material layer was passed through the dryer to remove the organic solvent used for preparation of the slurry or paste. Thereafter, the dried positive electrode plate was rolled under pressure by the roller pressing machine to produce a positive electrode plate 20 of 0.17 mm in thickness.

3. Production of an Electrode Assembly

The negative electrode plate 10 and positive electrode plate 20 were overlapped through a micro porous membrane of inexpensive polyolefin resin, preferably through a micro porous membrane (for example, of 0.025 mm in thickness) of polyethylene in such a manner that the center lines of the plates 10 and 20 in a width direction are coincided with each other. Thus, the overlapped electrode plates 10 and 20 were wound up spirally with the micro porous membrane by a winding machine and taped at their outermost peripheries to produce a spiral electrode assembly.

4. Preparation of Electrolyte

(1) EXAMPLE 1

A solvent mixture of 40 part by weight ethylene carbonate (EC) and 60 part by weight diethyl carbonate (DEC) was added to and mixed with $LiPF_6$ of 1 mole/liter as electrolyte salt. The solvent mixture was faker mixed with 2% by weight isopropylbenzene (cumene) represented by the following structural formula to prepare an amount of electrolyte [a] as an Example 1.

(2) EXAMPLE 2

A solvent mixture of 40 part by weight ethylene carbonate (EC) and 60 part by weight diethyl carbonate (DEC) was added to and mixed with $LiPF_6$ of 1 mole/liter and further mixed with 2% by weight 1,3-diisopropylbenzene represented by the following structural formula to prepare an amount of electrolyte [b] as an Example 2.

(3) EXAMPLE 3

A solvent mixture of 40 part by weight ethylene carbonate (EC) and 60 part by weight diethyl carbonate (DEC) was added to and mixed with $LiPF_6$ of 1 mole/liter and further mixed with 2% by weight of 1,4-diisopropylbenzene represented by the following structural formula to prepare an amount of electrolyte [c] as an Example 3.

(4) EXAMPLE 4

A solvent mixture of 40 part by weight ethylene carbonate (EC) and 60 part by weight diethyl carbonate (DEC) was mixed with $LiPF_6$ of 1 mole/liter as electrolyte salt and Her mixed with 2% by weight 1-methylpropyl benzene represented by the following structural formula to prepare an amount of electrolyte [d] as an Example 4.

(5) EXAMPLE 5

A solvent mixture of 40 part by weight ethylene carbonate (EC) and 60 part by weight diethyl carbonate (DEC) was mixed with $LiPF_6$ of 1 mole/liter as electrolyte salt and further mixed with 2% by weight 1,3-bis(1-methylpropyl) benzene represented by the following structural formula to prepare an amount of electrolyte [e] as an Example 5.

(6) EXAMPLE 6

A solvent mixture of 40 part by weight ethylene carbonate (EC) and 60 part by weight diethyl carbonate (DEC) was mixed with $LiPF_6$ of 1 mole/liter as electrolyte salt and further mixed with 2% by weight 1,4-bis(1-methylpropyl) benzene represented by the following structural formula to prepare an amount of electrolyte [f] as an Example 6.

(7) EXAMPLE 7

A solvent mixture of 40 part by weight ethylene carbonate (EC) and 60 part by weight diethyl carbonate (DEC) was mixed with $LiPF_6$ of 1 mole/liter as electrolyte salt and further mixed with 2% by weight cyclohexylbenzene represented by the following structural formula to prepare an amount of electrolyte [g] as an Example 7.

(8) EXAMPLE 8

A solvent mixture of 40 part by weight ethylene carbonate (EC) and 60 part by weight diethyl carbonate (DEC) was mixed with $LiPF_6$ of 1 mole/liter as electrolyte salt and further mixed with 2% by weight cyclopenthylbenzene represented by the following structural formula to prepare an amount of electrolyte [h] as an Example 8.

(9) COMPARATIVE EXAMPLE 1

A solvent mixture of 40 part by weight ethylene carbonate (EC) and 60 part by weight diethyl carbonate (DEC) was mixed with $LiPF_6$ of 1 mole/liter as electrolyte salt to prepare an amount of electrolyte [x] as a Comparative example 1 without addition of any additive.

(10) COMPARATIVE EXAMPLE 2

A solvent mixture of 40 part by weight ethylene carbonate (EC) and 60 part by weight diethyl carbonate (DEC) was mixed with $LiPF_6$ of 1 mole/liter as electrolyte salt and further mixed with 2% by weight of biphenyl ($C_{12}O_{10}$) to prepare an amount of electrolyte [y] as a Comparative example 2.

(11) COMPARATIVE EXAMPLE 3

A solvent mixture of 40 part by weight ethylene carbonate (EC) and 60 part by weight diethyl carbonate (DEC) was mixed with LiPF$_6$ of 1 mole/liter as electrolyte salt and further mixed with 2% by weight 4-chloroanisol to prepare an amount of electrolyte [z] as a Comparative example 3.

5. Manufacture of a Lithium Secondary Battery

As shown in FIG. 1, a pair of insulation plates 41 were attached to opposite ends of the electrode body assembly and contained in a cylindrical cell casing 40 which was made of a sheet metal and cylindrically formed by a pressing process. The cell casing 40 was used as a negative terminal of the battery. Subsequently, a current collector 10a extended from the negative electrode plate 10 of the battery was welded to an internal bottom portion of the cell casing 40 while a current collector 20a extended from the positive electrode plate 20 was welded to a bottom surface of a sealing cap with current interrupt device 50.

As shown in FIG. 2, the sealing cap with current interrupt device 50 is composed of a positive cap 51 of stainless steel formed in a reversed dish plate and a bottom plate 54 of stainless steel formed in a dish plate. The positive cap 51 has a convex portion 52 protruded upward and an annular flat flange portion 53 forming a bottom part of the convex portion 52. The convex portion 52 is formed at its corner with a plurality of circumferentially equally spaced vent holes 52a. The bottom plate 54 has a concave portion 55 protruded downward and an annular flat flange portion 56. The concave portion 55 of bottom plate 54 is formed at its corner with a plurality of circumferentially equally spaced vent holes 55a.

Disposed in a space between tile positive electrode plate 51 and bottom plate 54 is an electric conduction plate 57 which is deformed when an internal pressure of the battery exceeds a predetermined value. The electric conduction plate 57 was made of aluminum foil of 0.2 mm in thickness formed with uneven surfaces, which electric conduction plate 57 has a concave portion 57a and an annular flat flange portion 57b. The concave portion 57a of electric conduction plate 57 is placed in contact with the upper surface of concave portion 55 of bottom plate 54, and the flange portion 57b of electric conduction plate 57 is disposed between the flange portion 53 of positive electrode cap 51 and the flange portion 56 of bottom plate 53 and fixed in place in a liquid-tight manner through an insulation gasket 59 of polypropylene (PP).

Provided on the flange portion 57b of electric conduction plate 57 is a PTC (Positive Temperature Coefficient) thermistor element 58 the resistance value of which is increased in the occurrence of abnormal heat generation caused by flow of an electric current in the battery. When an internal gas pressure of the battery exceeds the predetermined value, the concave portion 57a of electric conduction plate 57 is deformed to disconnect the electric conduction plate 57 from the concave portion 55 of bottom plate 57 thereby to cut off flow of an electric current or short-circuit current in the battery.

The cell casing 40 was supplied with each electrolyte [a]–[h] and [x], [y], [z] and closed in a liquid-tight manner by means of the current interrupt device 50 fixedly coupled therewith through an insulation gasket 42 of polypropylene. Thus, eleven kinds of cylindrical lithium secondary batteries A–H and X, Y. Z were manufactured. Each nominal capacity of the lithium secondary batteries was 1350 mAh The lithium secondary batteries A–H were supplied with each electrolytes [a]–[h], and the batteries X, Y, Z were supplied with each electrolyte [x], [y], [z].

6. Test (1) Overcharge Test

The eleven kinds of lithium secondary batteries A–H and X, Y, Z each were charged by a charge current of 1350 mA (1C) until the battery voltage becomes 4.1 V. Thereafter, the secondary batteries each were fully charged at a constant voltage of 4.1 V for three hours and overcharged by a charge current of 2700 mA (2C) to measure each cut-off time of electric current in the batteries and each maximum temperature of the batteries. A result of the measurement is listed in the following table 1.

(2) Low Temperature Characteristic

The lithium secondary batteries A–H and X Y, Z were charged by a charge current of 1350 mA (1C) at a room temperature (25° C.) until the battery voltage becomes 4.1 V Subsequently the secondary batteries were charged at the constant voltage of 4.1 V for three hours and rested for three hours at the room temperature. Thereafter, the secondary batteries were discharged by a discharge current of 1350 mA (1C) at 0° C. until the final voltage becomes 2.75 V to measure each discharge capacity (mAh) of the batteries at the room temperature.

On the other hand, the lithium secondary batteries A–H and X, Y, Z each were charged by a charge current of 1350 mA (1C) until the battery voltage becomes 4.1 V Subsequently the secondary batteries were fully charged at the constant voltage of 4.1 V for three hours and rested at 0° C. for three hours Thereafter the secondary batteries were discharged by a discharge current of 1350 mA (1C) at 0° C. until the final voltage becomes 2.75 V to measure each discharge capacity (mAh) of the batteries at a low temperature.

Based on each discharge capacity of the batteries described above, a ratio of the discharge capacity (mAh) at the low temperature to the discharge capacity at the room temperature was calculated by the following formula (1) as a low temperature characteristic of the respective secondary batteries.

Low temperature characteristic=(Discharge capacity at low temperature/Discharge capacity at room temperature)×100%   (1)

A result of the calculation is listed in the following table 1.

(3) Storage Characteristics

The lithium secondary batteries A–H and X, Y, Z each were charged by a charge current of 1350 mA (1C) at a room temperature (25° C.) until the battery voltage becomes 4.1 V. Subsequently the secondary batteries were fully charged at the constant voltage of 4.1 V for three hours and stored in an atmosphere of 60° C. for twenty days. Thereafter, the secondary batteries were discharged by the discharge current of 1350 mA (1C) until the final battery voltage becomes 2.75 V to measure each discharge capacity of the batteries after storage at a high temperature. In addition, a ratio of the discharge capacity after storage at the high temperature to the discharge capacity at the room temperature was calculated by the following formula (2) as a storage characteristic of the respective batteries.

Storage characteristics=(Discharge capacity after storage at high temperature/Discharge capacity at room temperature)×100%   (2)

A result of the calculation is shown in the following table 1.

TABLE 1

| Kind of Battery | Electrolyte (Added amount of dissolved substance) wt. % Kind of Additive | Current cut-off time (Min.) | Maximum Temp. (° C.) | Low temperature characteristic (%) | Storage characteristic (%) |
|---|---|---|---|---|---|
| A | IM LiPF$_6$(EC:DEC = 4:6)2% Cumene | 15 | 74 | 83 | 91 |
| B | IM LiPF$_6$(EC:DEC = 4:6)2% (1,3-diisopropylbenzene | 17 | 81 | 83 | 92 |
| C | IM LiPF$_6$(EC:DEC = 4:6)2% 1,4-diisopropylbenzene | 17 | 83 | 84 | 89 |
| D | IM LiPF$_6$(EC:DEC = 4:6)2% 1-methylpropylbenzene | 17 | 78 | 83 | 90 |
| E | IM LiPF$_6$(EC:DEC = 4:6)2% 1,3-bis(1-methylpropyl) benzene | 18 | 80 | 81 | 89 |
| F | IM LiPF$_6$(EC:DEC = 4:6)2% 1,4-bis(1-methylpropyl) benzene | 19 | 82 | 83 | 91 |
| G | IM LiPF$_6$(EC:DEC = 4:6)2% cyclohexylbenzene | 15 | 72 | 85 | 92 |
| H | IM LiPF$_6$(ED:DEC = 4:6)2% cyclopentylbenzene | 17 | 79 | 84 | 90 |
| X | IM LiPF$_6$(EC:DEC = 4:6)2% without any additive | 32 | Burst | 85 | 93 |
| Y | IM LiPF$_6$(EC:DEC = 4:6)2% biphenyl | 20 | 88 | 60 | 85 |
| Z | IM LiPF$_6$(EC:DEC = 4:6)2% 4-chloroanisol | 21 | 90 | 77 | 65 |

As is understood from the table 1, the battery X using the electrolyte [x] of the Comparative example 1 prepared without addition of any additive burst upon lapse of thirty two minutes after overcharged, but the low temperature characteristics and storage characteristics of the battery X were excellent. In the battery Y using the electrolyte [y] of the Comparative example 2 prepared with addition of biphenyl, a charge current was cut off upon lapse of twenty minutes after the battery was overcharged. At the time, the maximum temperature of the battery Y was 88° C., and the low temperature characteristics and storage characteristics of the battery Y were deteriorated. In the battery Z using the electrolyte [z] of the Comparative example 3 prepared with addition of 4-chloroanisol, a charge current was cut off upon lapse of twenty one minutes after the battery was overcharged. At the time, the maximum temperature of the battery Z was 90° C., and the low temperature characteristics and storage characteristics of the battery Z were deteriorated.

In the batteries A–H respectively using the electrolytes [a]–[h] of the Examples 1–8, a charge current was cut off upon lapse of fifteen to nineteen minutes after the batteries were overcharged respectively. At the time, the maximum temperature of the respective batteries was 72–83° C., and the low temperature characteristic and storage characteristics of the respective batteries were excellent.

It is presumed that the above result was obtained for the following reason. When the batteries A–H are overcharged after charged at 4.1 V, additives such as isopropylbenzene (cumene), 1,3-diisopropylbenzene, 1,4-diisopropylbenzene, 1-methylpropylbenzene, 1,3-bis(1-methylpropyl) benzene, 1,4bis(1-methylpropyl)benzene, cyclohexylbenzene and cyclopentylbenzene are decomposed to generate gas therefrom and polymerized to generate polymerization heat. When the batteries are further overcharged in such a condition described above, the amount of gas increases, and the current interrupt device 50 is operated after lapse of fifteen to nineteen minutes to cut off an overcharge current so that the temperature of the respective batteries gradually lowers.

In comparison of the batteries A–H, it has been found that addition of the additives does not cause any significant difference in the characteristics of the batteries. From these facts, it is desirable that at least one of additives selected from the group consisting of isopropylbenzene (cumene), 1,3-diisopropylbenzene, 1,4-diisopropylbenzene, 1-methylpropylbenzene, 1,3-bis(1-methylpropyl) benzene, 1,4-bis(1methylpropyl) benzene, cyclohexylbenzene and cyclopentylbenzene is added to the electrolyte. Particularly, cyclohexylbenzene is useful to enhance the low temperature characteristics and storage characteristics of the lithium secondary battery.

7. Discussion of the Sort of Electrolyte

The influence caused by the sort of electrolyte was discussed as described below.

(1) EXAMPLE 9

A solvent mixture of 40 part by weight ethylene carbonate (EC) and 60 part by weight dimethyl carbonate (DMC) was mixed with LiPF$_6$ of 1 mole/liter and further mixed with 2% by weight cyclohexylbenzene to prepare an amount of electrolyte [i] as an Example 9.

(2) EXAMPLE 10

A solvent mixture of 40 part by weight ethylene carbonate (EC) and 60 part by weight methyl ethyl carbonate (MEC) was mixed with LiPF$_6$ of 1 mole/liter and further mixed with 2% by weight cyclohexylbenzene to prepare an amount of electrolyte [j] as an Example 10.

(3) EXAMPLE 11

A solvent mixture of 40 part by weight ethylene carbonate (EC), 30 part by weight dimethyl carbonate (DEC) and 30 part by weight dimethyl carbonate (DMC) was mixed with LiPF$_6$ of 1 mole/liter and flier mixed with 2% by weight cyclohexylbenzene to prepare an amount of electrolyte [k] as an Example 11.

(4) EXAMPLE 12

40 part by weight ethylene carbonate (EC) and 60 part by weight diethyl carbonate (DEC) was mixed with LiPF$_6$ of 0.5 mole/liter and LiBF$_4$ of 0.5 mole/liter as electrolytic salt and further mixed with 2% by weight cyclohexylbenzene to prepare an amount electrolyte [l] as an Example 12.

The electrolytes [i]–[l] each were stored in the cell casing 40, and the current interrupt device 50 was coupled with the opening of cell casing 40 and caulked to close the cell casing in a liquid-tight manner. Thus, lithium secondary batteries I–L using the electrolytes [i]–[l] were manufactured. The lithium secondary battery I was filled with the electrolyte [i], the lithium secondary battery J was filled with the electrolyte [j], the lithium secondary battery K was filled with the electrolyte [k], and the lithium secondary battery L was filled with the electrolyte [l].

The lithium secondary batteries I–L were overcharged in the same manner as described above to measure a lapse of time during which the current interrupt device 50 is operated after the battery was overcharged and to measure each maximum temperature of the batteries. A result of the measurement is listed in the following table 2. Similarly, the temperature characteristics and storage characteristics of the respective batteries were measured. A result of the measurement is listed in the following table 2.

As is understood from the table 2, it has been found that substitution of the sort of organic solvent or dissolved substance in the electrolyte does cause any significant difference in the current cut-off time, maximum temperature, low temperature characteristics and storage characteristics of the batteries. It is, therefore, noted that the additive comprised of cyclohexylbenzene is effective irrespectively the sort of electrolyte. Although the effect of an additive other than cyclohexylbenzene is not shown in the table 2, the same result as in use of cyclohexylbenzene was obtained in use of an additive selected from the group consisting of isopropylbenzene (cumene), 1,3-diisopropylbenzene, 1,4-diisopropylbenzene, 1-methylpropylbenzene, 1,3-bis(1-methylpropyl) benzene, 1,4-bis(1-methylpropyl) benzene, cyclohexylbenzene and cyclopentylbenzene.

8. Discussion of an Addition Amount of Additives

An influence caused by an addition amount of additives was discussed as described below.

(1) EXAMPLE 13

A solvent mixture of 40 part by weight ethylene carbonate (EC) and 60 part by weight diethyl carbonate (DEC) was mixed with LiPF$_6$ of 1 mole/liter and further mixed with 1% by weight cyclohexylbenzene added as an additive to prepare an amount of electrolyte [m] as an Example 13.

(2) EXAMPLE 14

A solvent mixture of 40 part by weight ethylene carbonate (EC) and 60 part by weight diethyl carbonate (DEC) was mixed with LiPF$_6$ of 1 mole/liter and further mixed with 3% by weight cyclohexylbenzene added as an additive to prepare an amount of electrolyte [n] as an Example 14.

(3) EXAMPLE 15

A solvent mixture of 40 part by weight ethylene carbonate (EC) and 60 part by weight diethyl carbonate (DEC) was mixed LiPF$_6$ of 1 mole/liter added thereto and further mixed with 5% by weight cyclohexylbenzene added thereto as an additive to prepare an amount of electrolyte [o] as an Example 15.

(4) EXAMPLE 16

A solvent mixture of 40 part by weight ethylene carbonate (EC) and 60 part by weight diethyl carbonate (DEC) was mixed with LiPF$_6$ of 1 mole/liter and further mixed with

TABLE 2

| Kind of Battery | Electrolyte (Added amount of dissolved substance) wt. % Kind of Additive | Current cut-off time (Min.) | Maximum Temp. (° C.) | Low temperature characteristic (%) | Storage characteristic (%) |
|---|---|---|---|---|---|
| I | 1M LiPF$_6$(EC:DMC = 4:6)2% cyclohexylbenzene | 15 | 73 | 84 | 92 |
| J | 1M LiPF$_6$(EC:MEC = 4:6)2% cyclohexylbenzene | 16 | 74 | 85 | 91 |
| K | 1M LiPF$_6$(EC:DEC:DMC = 4:3:3)2% cyclohexylbenzene | 16 | 76 | 84 | 91 |
| L | 0.5MLiPF$_6$ + 0.5MLiBF$_4$ (EC:DEC = 4:6)2% cyclohexylbenzene | 16 | 75 | 82 | 87 |

10% by weight cyclohexylbenzene added thereto as an additive to prepare an amount electrolyte [p] as an Example 16.

The electrolytes [m]–[p] each were stored in the cell casing 40, and the current interrupt device 50 was coupled the opening of cell casing 40 and caulked to close the cell casing 40 in a liquid-tight manner. Thus, lithium secondary batteries M–P using the electrolyte [m]–[p] were manufactured. The lithium second battery M was filled with the electrolyte [m] the lithium secondary battery N was filled with the electrolyte [n], the lithium secondary battery O was filled with the electrolyte [o], and the lithium secondary battery P was filled with the electrolyte [p].

The lithium secondary batteries M–P were overcharged in the same manner as described above to measure a lapse of time during which the current interrupt device 50 is operated after the battery was overcharged and to measure each maximum temperature of the batteries. A result of the measurement is listed in the following table 3. Similarly, the temperature characteristics and storage characteristics of the respective batteries were measured. A result of die measurement is listed in the following table 3. In the table 3, a measurement result of the battery added with 2% by weight cyclohexylbenzene is also listed.

methylpropyl) benzene, and 1,4bis(1-methylpropyl) benzene or cycloalkylbenzene derivative having tertiary carbon adjacent a phenyl group such as cyclohexylbenzene or cyclopentylbenzene is useful to ensure the safety of the battery against overcharge without causing any deterioration in cycle characteristics and storage characteristics of the battery at a low temperature.

Although in the foregoing embodiments, natural graphite (d=3.36 Å) was used as the negative electrode active material, it is desirable that carbon material capable of absorbing and desorbing lithium ion such as carbon black, coke, glassy carbon, carbon fiber or sintered material thereof are used as the negative electrode active material.

Although in the foregoing embodiments, $LiCoO_2$ was used as the positive electrode active material, it is desirable that lithium containing transition metal oxide compound capable of receiving lithium ion as a guest such as $LiNiO_2$, $LiCo_xNi_{(1-x)}O_2$, $LiCrO_2$, $LiVO_2$, $LiMnO_2$, $\alpha LiFeO_2$, $LiTiO_2$, $LiScO_2$, $LiYO_2$, $LiMn_2O_4$ and the like is used as the positive electrode active material. Particularly, it is preferable to use either $LiNiO_2$ or $LiCo_xNi_{(1-x)}O_2$ or a mixture of $LiNiO_2$ and $LiCo_xNi_{(1-x)}O_2$ as the positive electrode active material.

As the electrolyte, inexpensive ion conductive substance containing lithium salt dissolved in organic solvent, higher

TABLE 3

| Kind of Battery | Electrolyte (Added amount of dissolved substance) wt. % Kind of Additive | Current cut-off time (Min.) | Maximum Temp. (° C.) | Low temperature characteristic (%) | Storage characteristic (%) |
| --- | --- | --- | --- | --- | --- |
| M | IM $LiPF_6$(EC:DEC = 4:6)1% cyclohexylbenzene | 16 | 75 | 85 | 92 |
| G | IM $LiPF_6$(EC:DEC = 4:6)2% cyclohexylbenzene | 15 | 72 | 85 | 92 |
| N | IM $LiPF_6$(EC:DEC = 4:6)3% cyclohexylbenzene | 15 | 72 | 85 | 92 |
| O | IM $LiPF_6$(ED:DEC = 4:6)5% cyclohexylbenzene | 15 | 72 | 84 | 91 |
| P | IM $LiPF_6$(EC:DEC = 4:6)10% cyclohexylbenzene | 15 | 71 | 80 | 88 |

As is understood from the table 3, it has been found that addition of the additives in an extent of 1 to 10% by weight does not cause any significant difference in the current cut-off time, maximum temperature, low temperature characteristics and storage characteristics of the batteries. It is, therefore, desirable that the addition amount of the additive is determined in an extent of 1 to 10% by weight, preferably in an extent of 1 to 5% by weight. Although the effect of an additive other than cyclohexylbenzene is not shown in the table 3, the same result as in use of cyclohexylbenzene was obtained in use of an additive selected from the group consisting of isopropylbenzene (cumene), 1,3-diisopropylbenzene, 1,4-diisopropylbenzene, 1-methylpropylbenzene, 1,3-bis(1-methylpropyl) benzene, 1,4bis(1-methylpropyl) benzene, cyclohexylbenzene, and cyclopentylbenzene.

From the above fact, it has been confirmed that addition of an additive comprised of alkylbenzene derivative having tertiary carbon adjacent a phenyl group such as isopropylbenzene (cumene), 1,3-diisopropylbenzene, 1,4-diisopropylbenzene, 1-methylpropylbenzene, 1,3-bis(1- in ion conduction rate, chemically and electrochemically stable to the positive and negative electrodes, usable in a wide temperature range and higher in safety can be used in the battery. For example, at least one of solvents selected from the group consisting of EC, DEC, DMC, MEC, PC, SL, THF and GBL is used as the organic solvent, and at least one of Lithium salts selected from the group consisting of $LiPF_6$, $LiBF_4$, $LiClO_4$, $LiAsF_6$, $LiCF_3SO_3$, $Li(CF_3SO_2)_2N$, $Li(C_2F_5SO_2)_2N$ and $LiC_4F_9SO_3$, is used as the lithium salt.

What is claimed is:

1. A lithium secondary battery including an electrode assembly composed of positive and negative electrode plates wound up spirally with a separator and disposed in a cell casing filled with electrolyte containing lithium salt dissolved in organic solvent,
    wherein said cell casing is provided with a current interrupt device for cutting off charge current of the battery when its internal gas pressure rises excessively, and
    wherein said organic solvent contains a cycloalkylbenzene derivative having tertiary carbon adjacent a phenyl group.

2. A lithium secondary battery as in claim 1 wherein:
the cycloalkylbenzene is at least one of additives selected from either cyclohexylbenzene or cyclopentylbenzene.

3. A lithium secondary battery as in claim 1 wherein:
said positive electrode plate includes an active material comprising metal oxide containing lithium, and
said negative electrode plate includes an active material comprised of a carbon material.

4. A lithium secondary battery as in claim 1, wherein said current interrupt device comprises:
a positive temperature coefficient (PTC) element whose resistance value is increased by flow of an electric current in the battery, and
an electric conduction plate which is deformed when internal gas pressure of the battery rises excessively to cut-off the electric current applied to said PTC element.

5. A lithium secondary battery as in claim 2, wherein the amount of the additives is between 1 and 10% by weight of said organic solvent.

6. A lithium secondary battery as in claim 2, wherein the amount of the additives is between 1 and 5% by weight of said organic solvent.

7. A lithium secondary battery as in claim 1 wherein said organic solvent is at least one of solvents selected from the group consisting of ethylene carbonate (EC), diethyl carbonate (DEC), dimethyl carbonate (DMC), methyl ethyl carbonate (MEC), propylene carbonate (PC), sulfolane (SL), tetrahydrofuran (THF) and γ-butyrolactone (GBL).

8. A lithium secondary battery as in claim 1 wherein said organic solvent is at least one of solvents selected from the group consisting of ethylene carbonate (EC), diethy carbonate (DEC), dimethyl carbonate (DMC) and methyl ethyl carbonate (MEC).

9. A lithium secondary battery as in claim 1 wherein the lithium salt dissolved in said organic solvent is at least one of lithium salts selected from the group consisting of $LiPF_6$, $LiBF_4$, $LiClO_4$, $LiAsF_6$, $LiCF_3SO_3$, $Li(CF_3SO_2)_2N$, $Li(C_2F_6SO_2)_2N$ and $LiC_4F_9SO_3$.

10. A lithium secondary battery as in claim 1 wherein the lithium salt dissolved in said organic solvent is at least one of lithium salts selected from the group consisting of $LiPF_6$ and $LiBF_4$.

11. A lithium secondary battery as in claim 2 wherein:
said positive electrode plate includes an active material comprising metal oxide containing lithium, and said negative electrode plate includes an active material comprised of a carbon material.

12. A lithium secondary battery as in claim 2 wherein said current interrupt device comprises:
a positive temperature coefficient (PTC) element whose resistance value is increased by flow of an electric current in the battery, and
an electric conduction plate which is deformed when an internal gas pressure of the battery rises excessively to cut-off the electric current applied to said PTC element.

13. A lithium secondary battery as in claim 3 wherein said current interrupt device comprises:
a positive temperature coefficient (PTC) element whose resistance value is increased by flow of an electric current in the battery, and
an electric conduction plate which is deformed when an internal gas pressure of the battery rises excessively to cut-off the electric current applied to said PTC element.

14. In a lithium battery having separated positive and negative electrodes disposed in a closed cell casing with an electrolyte containing lithium salt dissolved in organic solvent and having an internal current interrupt switch automatically operated by gas pressure inside the casing, the improvement comprising:
said organic solvent containing a cycloalkylbenzene derivative having tertiary carbon adjacent a phenyl group so as to more quickly build up internal casing gas pressure and operate said current cut-off switch after the battery is fully charged.

15. An improved lithium battery as in claim 14 wherein:
the cycloalkylbenzene is at least one of additives selected from either cyclohexylbenzene or cyclopentylbenzene.

16. An improved lithium battery as in claim 14 wherein:
said positive electrode plate includes an active material comprising metal oxide containing lithium, and
said negative electrode plate includes an active material comprised of a carbon material.

17. An improved lithium battery as in claim 14 wherein:
said current interrupt device comprises:
a positive temperature coefficient (PTC) element whose resistance value is increased by flow of an electric current in the battery, and
an electric conduction plate which is deformed when internal gas pressure of the battery rises excessively to cut-off the electric current applied to said PTC element.

18. A lithium secondary battery as in claim 15, wherein the amount of the additives is between 1 and 10% by weight of said organic solvent.

19. A lithium secondary battery as in claim 15, wherein the amount of the additives is between 1 and 5% by weight of said organic solvent.

20. A lithium secondary battery as in claim 14 wherein said organic solvent is at least one of solvents selected from the group consisting of ethylene carbonate (EC), diethyl carbonate (DEC), dimethyl carbonate (DMC), methyl ethyl carbonate (MEC), propylene carbonate (PC), sulfolane (SL), tetrahydrofuran (THF) and γ-butyrolactone (GB).

* * * * *

UNITED STATES PATENT AND TRADEMARK OFFICE
CERTIFICATE OF CORRECTION

PATENT NO. : 6,632,572 B1  Page 1 of 1
DATED : October 14, 2003
INVENTOR(S) : Takahashi et al.

It is certified that error appears in the above-identified patent and that said Letters Patent is hereby corrected as shown below:

Column 3,
Line 44, change "batters" to -- battery --.
Line 54, change "AMP)" to -- (NMP) --.

Column 4,
Line 48, change "faker" to -- further --.

Column 6,
Line 61, change "$C_{12}O_{10}$" to -- $C_{12}H_{10}$ --.

Column 13,
Line 21, change "die" to -- the --.

Column 15,
Line 32, change "diethy" to -- diethyl --.

Signed and Sealed this

Second Day of March, 2004

JON W. DUDAS
*Acting Director of the United States Patent and Trademark Office*